(12) United States Patent
Park (10) Patent No.: US 9,377,980 B2
(45) Date of Patent: Jun. 28, 2016

(54) HOST APPARATUS AND SERVER CONNECTED TO IMAGE FORMING APPARATUS TO PERFORM PULL PRINTING, AND PRINTING METHOD THEREOF

(75) Inventor: Seong-Taek Park, Yongin-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 944 days.

(21) Appl. No.: 12/911,934

(22) Filed: Oct. 26, 2010

(65) Prior Publication Data

US 2011/0157626 A1    Jun. 30, 2011

(30) Foreign Application Priority Data

Dec. 28, 2009    (KR) .................. 10-2009-0131573

(51) Int. Cl.
   *G06F 3/12*    (2006.01)
   *H04N 1/00*    (2006.01)

(52) U.S. Cl.
   CPC ............... *G06F 3/126* (2013.01); *G06F 3/122* (2013.01); *G06F 3/1267* (2013.01); *G06F 3/1288* (2013.01); *H04N 1/0023* (2013.01); *H04N 1/00233* (2013.01); *H04N 1/00244* (2013.01); *G06F 3/1222* (2013.01); *G06F 3/1238* (2013.01); *G06F 3/1274* (2013.01); *H04N 2201/0082* (2013.01); *H04N 2201/0093* (2013.01); *H04N 2201/0094* (2013.01)

(58) Field of Classification Search
   CPC .................................................. H04N 1/0023
   USPC ...................................................... 358/1.15
   See application file for complete search history.

(56) References Cited

U.S. PATENT DOCUMENTS

| 7,337,472 | B2 | 2/2008 | Olsen et al. | |
|---|---|---|---|---|
| 2001/0043353 | A1* | 11/2001 | Iizuka | G06F 1/3215 358/1.14 |
| 2004/0109063 | A1* | 6/2004 | Kusaka | H04N 1/00244 348/207.1 |
| 2005/0068566 | A1* | 3/2005 | Nishiguchi | G06F 3/1204 358/1.15 |
| 2006/0007485 | A1 | 1/2006 | Miyazaki | |
| 2006/0077456 | A1* | 4/2006 | Aoki | G06F 3/1222 358/1.15 |
| 2007/0035767 | A1* | 2/2007 | Numata | G06Q 30/04 358/1.15 |

(Continued)

FOREIGN PATENT DOCUMENTS

| JP | 2006-25257 | 1/2006 |
|---|---|---|
| JP | 2006-099714 | 4/2006 |

(Continued)

OTHER PUBLICATIONS

Office Action mailed Nov. 18, 2015 in Korean Patent Application No. 10-2009-0131573.

(Continued)

*Primary Examiner* — Benjamin O Dulaney
(74) *Attorney, Agent, or Firm* — Staas & Halsey LLP (57) ABSTRACT

A method to pull print, and a host apparatus and a server that are connected to an image forming apparatus, to pull print. The printing method includes generating print data to pull print in the host apparatus, storing the generated print data in the host apparatus, determining whether a predetermined relocation condition is satisfied with respect to the generated print data, and transmitting the print data stored in the host apparatus to the server if it is determined that the predetermined relocation condition is satisfied with respect to the print data.

16 Claims, 10 Drawing Sheets

(56) References Cited

U.S. PATENT DOCUMENTS

| | | | | |
|---|---|---|---|---|
| 2007/0109420 A1* | 5/2007 | Takeshi | .............. | H04N 1/00127 348/211.99 |
| 2007/0201091 A1* | 8/2007 | Tanaka | .................. | G06F 3/1204 358/1.16 |
| 2007/0206225 A1* | 9/2007 | Shinohara | .......... | H04N 1/00127 358/1.16 |
| 2007/0237427 A1* | 10/2007 | Patel | .................. | G06K 9/00442 382/305 |
| 2009/0059274 A1* | 3/2009 | Tomita | .................. | G06F 3/1204 358/1.15 |
| 2009/0310172 A1* | 12/2009 | Miyamoto | ......... | H04N 1/00233 358/1.15 |
| 2010/0095349 A1* | 4/2010 | Motoyama | .............. | H04L 63/20 726/1 |
| 2010/0165395 A1* | 7/2010 | Yamauchi | .......... | H04N 1/00217 358/1.15 |
| 2010/0202009 A1* | 8/2010 | Greene | ................. | G06F 3/1288 358/1.15 |
| 2011/0128389 A1* | 6/2011 | Maeda | ............... | H04N 1/00204 348/207.1 |
| 2013/0003107 A1* | 1/2013 | Berglin | ................. | G06F 3/1205 358/1.14 |

FOREIGN PATENT DOCUMENTS

| | | |
|---|---|---|
| JP | 2009-54006 | 3/2009 |
| JP | 2009-303008 | 12/2009 |

OTHER PUBLICATIONS

Notice of Allowance mailed Apr. 6, 2016 in Korean Patent Application No. 10-2009-0131573.

* cited by examiner

HOST APPARATUS AND SERVER CONNECTED TO IMAGE FORMING APPARATUS TO PERFORM PULL PRINTING, AND PRINTING METHOD THEREOF

CROSS-REFERENCE TO RELATED APPLICATIONS

This application claims priority from Korean Patent Application No. 10-2009-0131573, filed on Dec. 28, 2009 in the Korean Intellectual Property Office, the disclosure of which is incorporated herein by reference.

BACKGROUND

1. Field of the Invention

The present general inventive concept relates to pull printing, and more specifically, to a host apparatus and a server that are connected to an image forming apparatus, and that generate and store print data to pull print.

2. Description of the Related Art

An image forming apparatus forms an image to be printed on a printing medium, and may be provided as a printer, a facsimile, a multi-function device, or the like.

In a network printing environment in which a plurality of users commonly uses an image forming apparatus, each user generates print data using a host apparatus such as a personal computer, and the generated print data is transmitted through network to a desired image forming apparatus to print.

The image forming apparatus receives the print data from at least one host apparatuses and performs printing in a received order.

However, in a case where printing is performed in a received order, if a variety of printing operations are concentrated on a specific image forming apparatus, processing time of the image forming apparatus is increased, thereby delaying printing outputs. Further, in this case, users are likely to forget to take the printed matters, which may result in losing the printing outputs. Furthermore, in the case that various printed matters are mixed, users have difficulty finding their own printed matters, and specific confidential printed matters may be exposed to unauthorized people.

To solve these problems, a host apparatus may generate print data using a pull printing function.

In the case of the pull printing, print data generated in a host apparatus is temporarily stored in a separate server. Then, as a user inputs a print request through an image forming apparatus, the image forming apparatus receives the print data from the server and performs printing.

However, in a conventional pull printing process, once print data generated in a plurality of host apparatuses is transmitted to a server, the server should perform all necessary processes.

Thus, most of printing load is concentrated on the server. If the number of the image forming apparatuses or the amount of printing operations becomes large compared with the capacity of the server, the pull printing function can not be normally performed. In this case, the capacity, i.e., the number of the servers, should be increased. The additional servers, however, cause an increase in cost to build and maintain the servers, thereby burdening users.

Further, in a case where a storage capacity of the server is insufficient due to temporary increases in printing jobs, print data generated in the host apparatus can not be normally stored in the server, thereby interrupting the normal printing process.

SUMMARY

Accordingly, exemplary embodiments of the general inventive concept provide a host apparatus and a server which are connected to an image forming apparatus, and a printing method thereof, in which print data to pull print is temporarily stored in a storage space of the host apparatus and then is transmitted to the server, in consideration of a state of the server in which the print data to pull print is to be stored, to thereby reduce load of the server and effectively use the storage spaces of the host apparatus and the server.

Additional features and utilities of the present general inventive concept will be set forth in part in the description which follows and, in part, will be obvious from the description, or may be learned by practice of the present general inventive concept.

The foregoing and/or other features may be achieved by providing a printing method in a host apparatus which generates print data to pull print using a server which is configured to store the print data, including generating the print data to pull print in the host apparatus, storing the generated print data in the host apparatus, determining whether a predetermined relocation condition is satisfied with respect to the generated print data, and transmitting the print data stored in the host apparatus to the server if it is determined that the predetermined relocation condition is satisfied with respect to the print data.

The predetermined relocation condition may include at least one of a storage space of the server, a storage space of the host apparatus, a state change of the host apparatus and elapsed time of the print data.

The state change may include at least one of shutdown, reboot, user logout, transition to a power save mode, and no response of the host apparatus.

The method may further include displaying a pop-up message in the host apparatus so that a user may select relocation of the print data, if the predetermined relocation condition is satisfied with respect to the print data.

The print data storing may include notifying the server of job information about the print data.

The method may further include determining whether a predetermined retention time of the print data elapses, and deleting the print data stored in at least one of the host apparatus and the server if it is determined that the predetermined retention time elapses.

The method may further include: receiving a print request corresponding to the print data to pull print from the image forming apparatus; and to transmit the print data stored in at least one of the host apparatus and the server to the image forming apparatus according the print request.

The method may further include deleting the print data based on a predetermined print option with respect to the print data to pull print.

The print option may include any one of retention after printing and deletion after printing.

Another feature of the present general inventive concept is achieved by providing a host apparatus which generates print data to pull print using a server which is configured to store the print data, including an image processing part which generates the print data to pull print, a storage part which stores the generated print data, a communication part which performs communication with the server, and a controller which determines whether a predetermined relocation condition is satisfied with respect to the generated print data and controls, if it is determined that the predetermined relocation condition is satisfied with respect to the print data, the communication part to transmit the print data stored in the storage part to the server.

The predetermined relocation condition may include at least one of a storage space of the server, a storage space of the host apparatus, a state change of the host apparatus, and elapsed time of the print data.

The state change may include at least one of shutdown, reboot, user logout, transition to a power save mode and no response of the host apparatus.

The host apparatus may further include a display part which displays a pop-up message so that a user may select relocation of the print data, if it is determined that the predetermined relocation condition is satisfied with respect to the print data.

The communication part may notify the server of job information about the print data.

The controller may determine whether a predetermined retention time of the print data elapses, and delete the print data stored in the storage part if it is determined that the predetermined retention time elapses.

The controller may delete the print data stored in the storage part based on a predetermined print option with respect to the print data to pull print.

The print option may include any one of retention after printing and deletion after printing.

Still another feature of the present general inventive concept is achieved by providing a server that stores job information about pull printing. The server includes a communication part that performs communication with a host apparatus which generates and stores print data to pull print, a storage part which stores a job information table which includes information about a storage location of the print data to pull print, and a controller that determines, if a print request corresponding to the print data to pull print is received through the communication part from the image forming apparatus, the storage location of the print data with reference to the job information table, and controls the communication part to transmit the print request to the host apparatus if it is determined that the print data is stored in the host apparatus.

The controller may control the communication part to transmit the print data to the image forming apparatus if it is determined that the print data is stored in the server.

Yet another feature of the present general inventive concept is achieved by providing an index server that stores job information about pull printing. The index server includes a communication part to perform communication with an image forming apparatus and a host apparatus that generates and stores print data to pull print, a spool server to receive the print data from the host apparatus and stores the print data, a storage part to store a job information table that includes information about a storage location of the print data to pull print, and a controller that determines the storage location of the print data with reference to the job information table, if a print request corresponding to the print data to pull print is received from the image forming apparatus through the communication part, and controls the communication part to transmit the print request to any one of the host apparatus and the spool server based on the determination.

According to the host apparatus and the server, and the printing method thereof, the print data to pull print may be temporarily stored in a storage space of the host apparatus and then may be transmitted to the server, based on a state of the server in which the print data is to be stored. Accordingly, load on the server may be reduced to more efficiently utilizing the storage spaces of the host apparatus and the server.

Another feature of the present general inventive concept is achieved by providing a printing method to pull print including generating the data using a host apparatus, storing the generated data in a memory included with the host apparatus, determining a state of at least one server, and sending the data from the memory of the host apparatus to the at least one server based on the determined state of the at least one server.

Yet another feature of the present general inventive concept is achieved by providing a system to pull print including a system to pull print data. The system includes a host apparatus to generate print data to pull print, and also has a host storage part to store the print data. The system includes an image forming apparatus in communication with the host apparatus to print the print data, a server in communication with the host apparatus and the image forming apparatus and having a first server storage part to store the print data and a second server storage part to store a job information table describing information about a storage location of the print data. The system includes a controller in communication with the host apparatus, the image forming apparatus and the server, that receives a print request from the image forming apparatus corresponding to the print data, that determines the storage location of the print data based on the job information table in response to the print request, that determines whether a predetermined relocation condition exists with respect to the print data, and that controls the host apparatus and the server to deliver the print data to the image forming apparatus based on the storage location of the print data and the existing predetermined relocation condition.

BRIEF DESCRIPTION OF THE DRAWINGS

The above and/or other features of the present general inventive concept will become apparent and more readily appreciated from the following description of the exemplary embodiments, taken in conjunction with the accompanying drawings, in which.

DETAILED DESCRIPTION OF THE EMBODIMENTS

Exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 1:
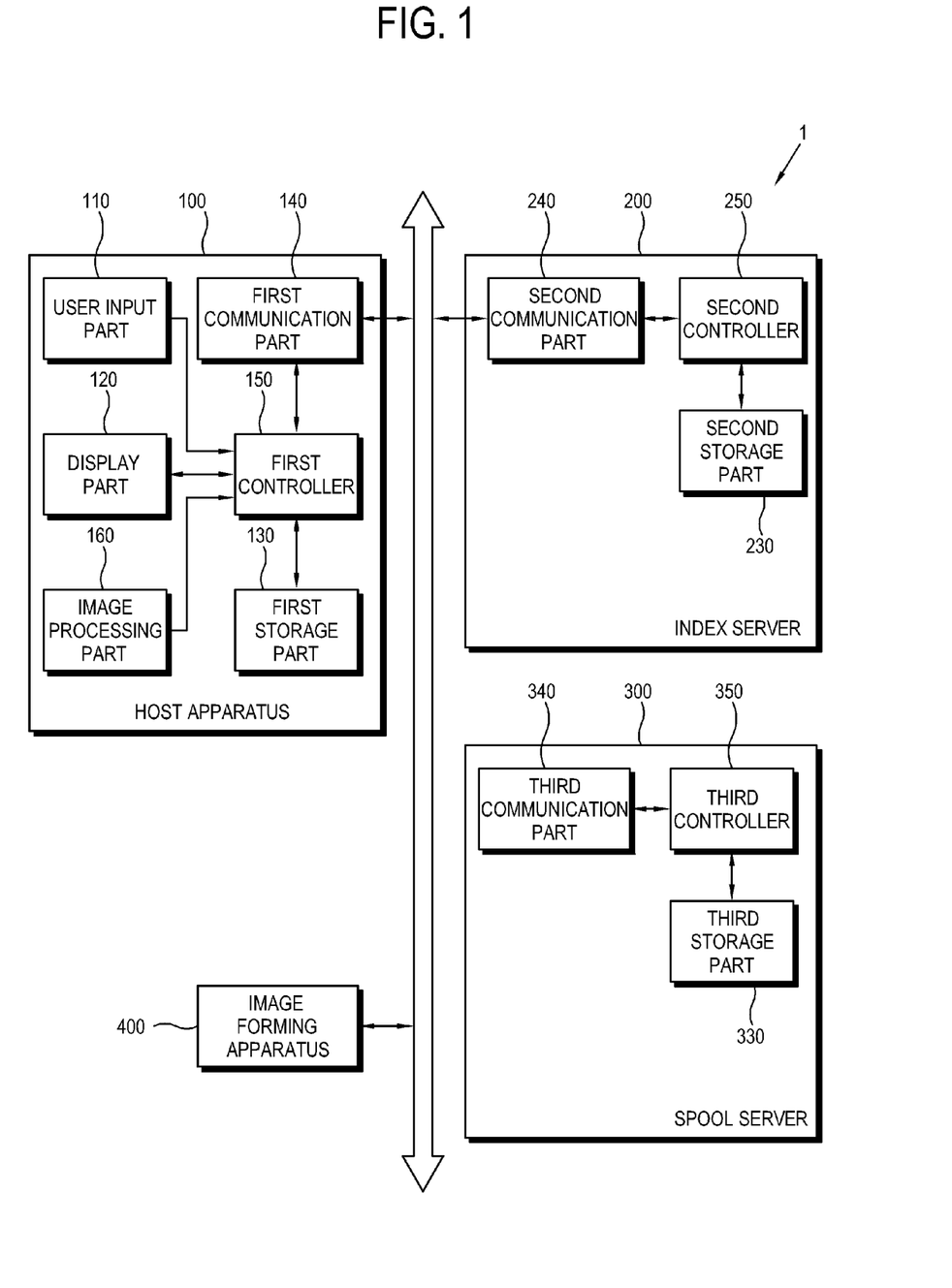
FIG. 1 is a block diagram illustrating a configuration of a pull printing system according to an exemplary embodiment.

FIG. 1 is a block diagram illustrating a configuration of a pull printing system 1 according to an exemplary embodiment.

As shown in FIG. 1, the pull printing system 1 according to at least one exemplary embodiment may include a host apparatus 100, an index server 200, a spool server 300, and an image forming apparatus 400.

The index server 200 is a database in which job information on print data generated in the host apparatus 100 is stored, and the spool server 300 is a database in which the print data is stored. The index server 200 and the spool server 300 may be provided as two separate apparatuses, or may be provided as a single apparatus to perform the functions of the index server 200 and the spool server 300. FIG. 1 illustrates an exemplary embodiment where the index server 200 and the spool server 300 are separately provided.

The host apparatus 100 may be provided as a personal computer. The image forming apparatus 400 may be provided as a printer, a multi-function device or the like, which includes an image forming part (not shown) to perform printing according to a print request and may be connected to other apparatuses through network such as LAN (Local Area Network), USB (Universal Serial Bus), parallel communication, UNC (Universal Network Controller), or the like.

In this description, printing may include printing one or more copies after scanning an original document, printing received facsimile data, and/or printing print data which is received from external apparatuses, such as a server or a host apparatus, or which is stored in an HDD inside the image forming apparatus 400 or external memories, such as a USB.

The image forming apparatus 400 is a network image forming apparatus to which an individual IP address is allocated, and may be shared on network.

As shown in FIG. 1, the host apparatus 100 includes a user input part 110, a display part 120, a first storage part 130, a first communication part 140, a first controller 150, and an image processing part 160.

Through the user input part 110, a user may input or select a variety of commands.

Specifically, the user input part 110 may receive a command to generate print data to pull print from the user.

In this respect, the user may select pull printing by executing a printer driver or application programs to support functions of the image forming apparatus 400 using the user input part 110, and may input a command to generate print data.

The user may login to the printer driver and/or application programs through the user input part 110. The user input part 110 receives user authentication information corresponding to the login from the user. The first controller 150 authenticates the concerned user through the received user authentication information.

The user input part 110 includes a keyboard, a mouse or the like which is provided as an input device of the host apparatus 100. Further, the user input part 110 may include a graphic user interface (GUI) (hereinafter, also referred to as GUI), which is generated by execution of the printer driver or a separate application program and is displayed on the display part 120 to be input by a user. The GUI include icons, buttons, text input windows or the like which may be selected from the user.

The display part 120 may include an LCD (Liquid Crystal Display) and a driver to drive the LCD, and may display a GUI or the like with respect to printing.

For example, in a case where a predetermined relocation condition occurs with respect to print data to pull print, the display part 120 may display a message that may be selected by a user with respect to the relocation of the print data, or a message to notify the user of the relocation result.

If the user selects the relocation of the print data through the displayed message, the first controller 150 may control the first communication part 140 to transmit the print data to pull print stored in the first storage part 130 to the server, that is, the spool server 300. According to an exemplary modified embodiment, the control may be preset to be automatically performed without user selection.

The first storage part 130 temporarily stores the print data to pull print. The first storage part 130 of the host apparatus 100 according to the present embodiment may include user identification information. The first storage part 130 may be provided as an internal and/or external memory module such as an HDD and/or a flash memory.

The first communication part 140 performs communication with the index server 200, the spool server 300, and the image forming apparatus 400. The first communication part 140 may be provided as a wired and/or wireless communication module which may be network-connected through a predetermined protocol to external devices, for example, the index server 200, the spool server 300, and the image forming apparatus 400.

The first controller 150 controls the operation of the host apparatus 100. The first controller 150 may be provided as a combination of hardware such as a CPU and software, firmware, or the like.

In this respect, the host apparatus 100 according to an exemplary embodiment may be provided with a relocation agent 102 to manage the print data to pull print, and to control operations with respect to the relocation of the print data.

Specifically, if a command to pull print is received from a user, the first controller 150 controls the image processing part 160 to generate print data.

The image processing part 160 generates the print data which is made of a predetermined language under the print command received through the user input part 110. Here, the print data may be referred to as print data to pull print generated under the pull print command.

The generated print data to pull print is temporarily stored in the first storage part 130 which is provided in the host apparatus 100, and is transmitted to the spool server 300 through the first communication part 140 if the predetermined relocation condition of the print data is satisfied.

The print data transmitted to the spool server 300 is transmitted to the image forming apparatus 400 if a print request is received from the image forming apparatus 400. The image forming apparatus 400 receives the print data from the host apparatus 100 and then performs printing.

The image processing part 160 may include a printer driver to generate print data of a predetermined printing language.

The print data to pull print generated in the host apparatus 100 is allocated at a predetermined retention time. The retention time may be set in statistical consideration of elapsed time from the time of generation of the print data to pull print to the time of printing completion through the image forming apparatus 400.

Figure 2:
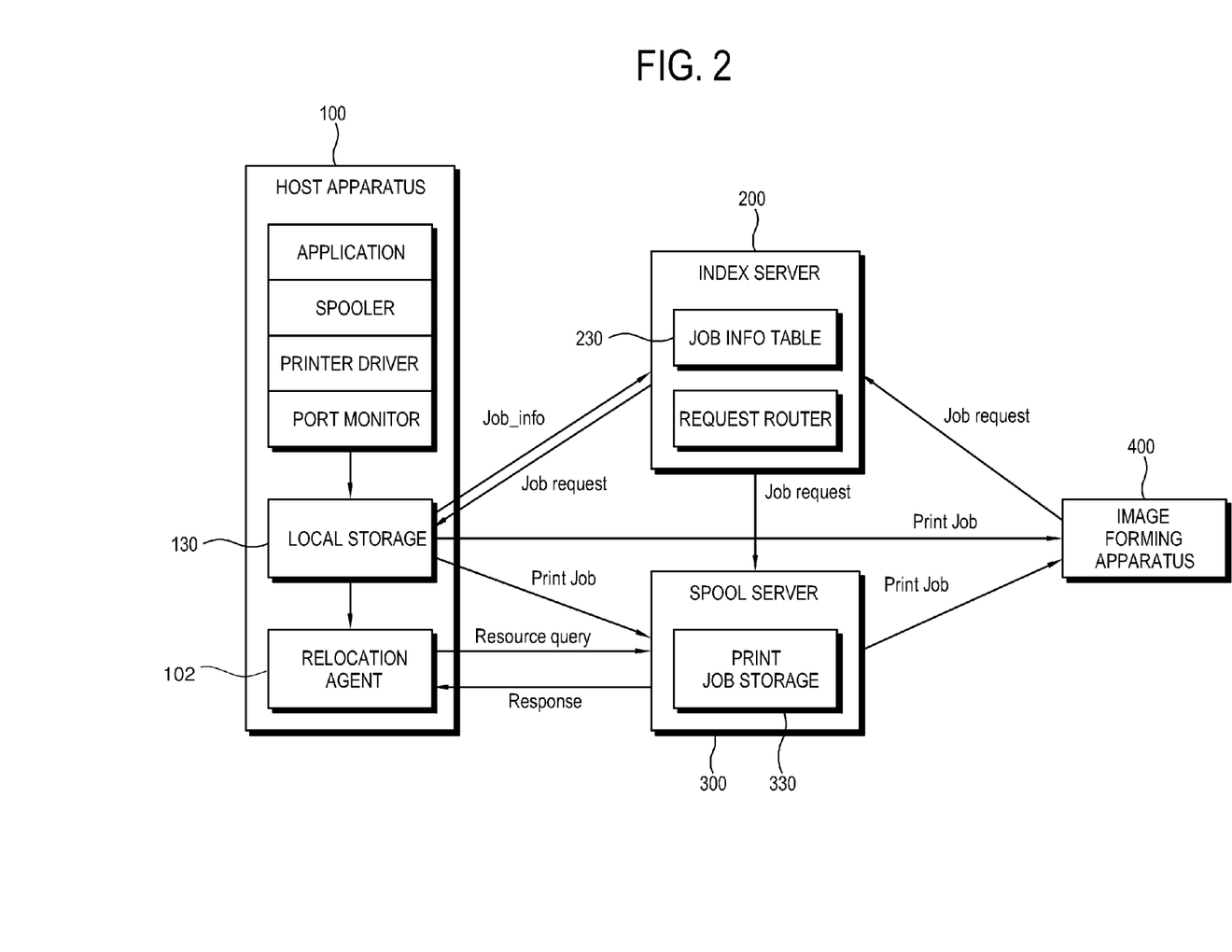
FIG. 2 is a diagram illustrating a pull printing operation of a host apparatus according to an exemplary embodiment.

FIG. 2 is a diagram illustrating a pull printing operation in the host apparatus 100 according to an exemplary embodiment.

As shown in FIG. 2, the first controller 150 stores the print data generated to pull print in the first storage part 130 (LOCAL STORAGE).

The first controller 150 controls the first communication part 140 to transmit job information about the print data to pull print to the index server 200.

Referring to FIG. 1, the index server 200 includes a second storage part 230, a second communication part 240 and a second controller 250.

The second storage part 230 includes a job information table (JOB INFO TABLE) where job information about the pull printing is stored.

The job information table may store therein, for example, the following information.

---
JobName = sample.doc
Owner = John
SubmitTime = 2009-01-01 15:00:00
JobStore = ClientStation__1
---

That is, information including the name, owner, generation time of the generated print data, and an identifier of the corresponding host apparatus 100 may be stored in the job information table.

The second controller 250 controls the second communication part 240 to receive job information about the print data to pull print which is transmitted from the host apparatus 100, and stores the received job information in the job information table of the second storage part 230.

The second controller 250 may update the job information table by continuously monitoring information received from the host apparatus 100.

For example, if the print data to pull print which is stored in the host apparatus 100 is relocated into the spool server 300, the second controller 250 receives changed job information about the print data from the host apparatus 100, and accordingly updates the job information table. Thus, the job information (JobStore) in the job information table is updated into the identifier of the spool server 300 where the print data is stored.

The index server 200 may serve as a router which receives a print request from the image forming apparatus 400 and transmits the print request to the host apparatus 100 and/or the spool server 300.

The relocation agent of the host apparatus 100 monitors whether the relocation condition of the print data is satisfied. If the relocation condition is satisfied, the first controller 150 controls the first communication part 140 to transmit the print data in the first storage part 130 to the spool server 300.

In this respect, the relocation condition may include at least one of a storage space of the spool server 300, a storage space of the host apparatus 100, a state change of the host apparatus 100, and elapsed time of the print data.

Figure 3:
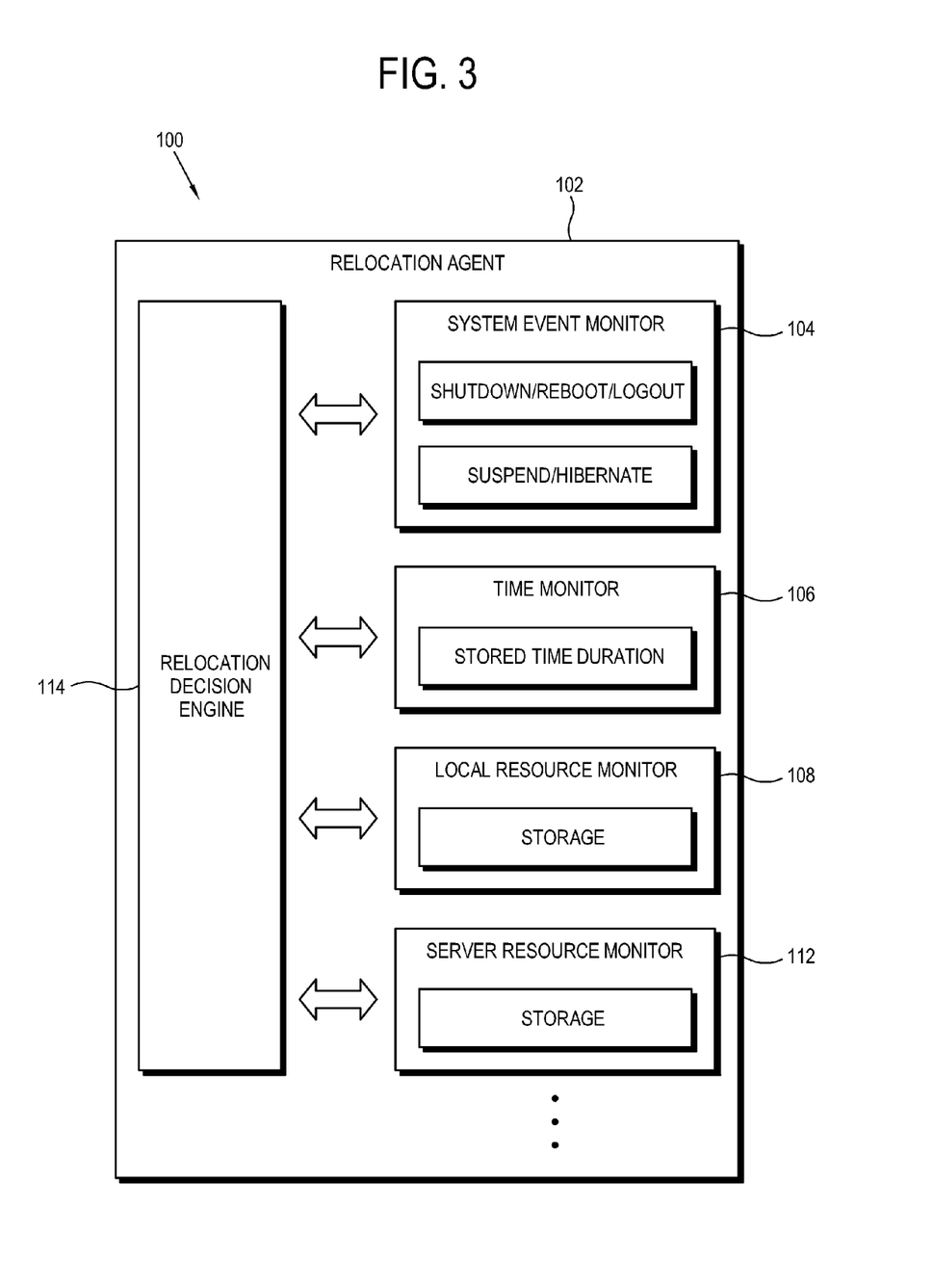
FIG. 3 is a diagram illustrating an operation of a relocation agent of a host apparatus according to an exemplary embodiment.

FIG. 3 is a diagram illustrating an operation of the relocation agent 102 of the host apparatus 100 according to an exemplary embodiment.

As shown in FIG. 3, the relocation agent 102 includes a system event monitor 104 to monitor a state change of the host apparatus 100, a time monitor 106 to monitor elapsed time from storage of the print data, a local resource monitor 108 to monitor a storage space of the first storage part 130, a server resource monitor 112 to monitor a storage space of the spool server 300, and a relocation decision engine 114 to decide to relocate the print data based on events occurring in the respective monitors.

The state change which is monitored by the system event monitor may include at least one event of the host apparatus 100 including, but not limited to, shutdown, reboot, user logout, transition to a power save mode, and no response.

More specifically, the system event monitor monitors important system events with respect to the possibility of access to the host apparatus 100 from the outside, and if a specific event occurs, the system event monitor may interrupt the state change of the system and then relocate the print data into the spool server 300.

In this respect, on the occurrence of the event, the first controller 150 may control the display part 120 to initiate an alert, such as displaying a pop-up message or the like, to notify a user of the occurrence of the event. The displayed pop-up message may include a user interface (UI) to be selected by a user with respect to the relocation of the print data.

If at least one event occurs which is monitored by the relocation agent, the first controller 150 controls the first communication part 140 to transmit the print data to pull print, which is stored in the first storage part 130 to the spool server 300.

For example, while the print data to pull print is stored in the host apparatus 100, if a state change event occurs, such as shutdown, reboot, or logout, the first controller 150 controls the first communication part 140 to transmit the print data stored in the first storage part 130 to the spool server 300.

Thus, a user may print the print data to pull print anytime, irrespective of the shutdown of the host apparatus 100, the external access possibility, or the like.

The time monitor 106 monitors whether elapsed time after the print data to pull print is stored in the host apparatus 100 exceeds a predetermined reference time. If it is monitored that the elapsed time exceeds the predetermined reference time, the first controller 150 controls the first communication part 140 to transmit the print data stored in the first storage part 130 to the spool server 300.

In this respect, the predetermined reference time may be set in consideration of average time, which ranges from the time of generation of the print data to pull print to the time of input of the print request, or the retention time of the print data.

The local resource monitor 108 periodically monitors available system resources such as a storage space (HDD), CPU, memory or the like of the host apparatus 100, and adjusts transmission time of the print data so that the print data is transmitted to the spool server 300 if the storage space of the host apparatus 100 is insufficient.

The server monitor 112 periodically monitors available system resources of the spool server 300, such as a storage space (HDD), CPU, memory or the like, and adjusts the transmission time of the print data to be delayed if the storage space is low.

Further, the first controller 150 controls the first communication part 140 to notify the index server 200 that a storage location of the print data has been changed (i.e. the print data has been relocated into the spool server 300).

Referring to FIG. 1, the spool server 300 includes a third storage part 330, a third communication part 340 and a third controller 350.

The third storage part 330 includes a print job storage where the print data to pull print is stored.

The third controller 350 controls the third communication part 340 to receive the print data to pull print transmitted from the host apparatus 100, and stores the received print data into the third storage part 330.

If a print request corresponding to the pull printing job is received from the index server 200, the third controller 350 transmits the print data stored in the third storage part 330 to the image forming apparatus 400.

As described above, the index server 200 and the spool server 300 may be provided as a single server.

The image forming apparatus 400 includes an image forming part to perform printing based on the print data. The user may input a print request corresponding to the print data to pull print through a user input part (not shown) provided in the image forming apparatus 400.

The image forming apparatus 400 receives the print data from any one of the host apparatus 100 and the spool server 300 in response to the print request, and then performs printing.

Figure 4:
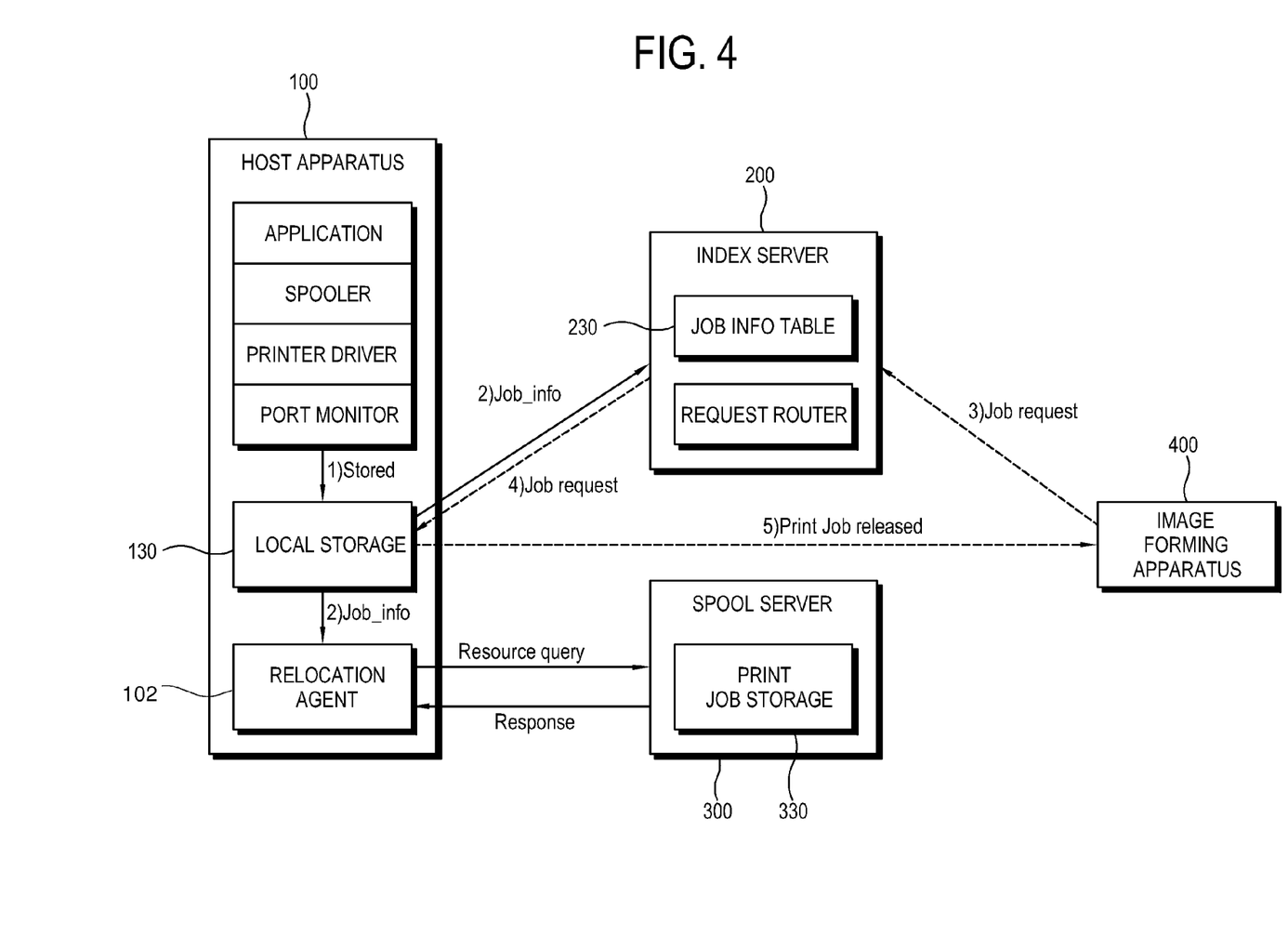
FIGS. 4-6 are diagrams illustrating a pull printing process in a pull printing system according to an exemplary embodiment.
Figure 5:
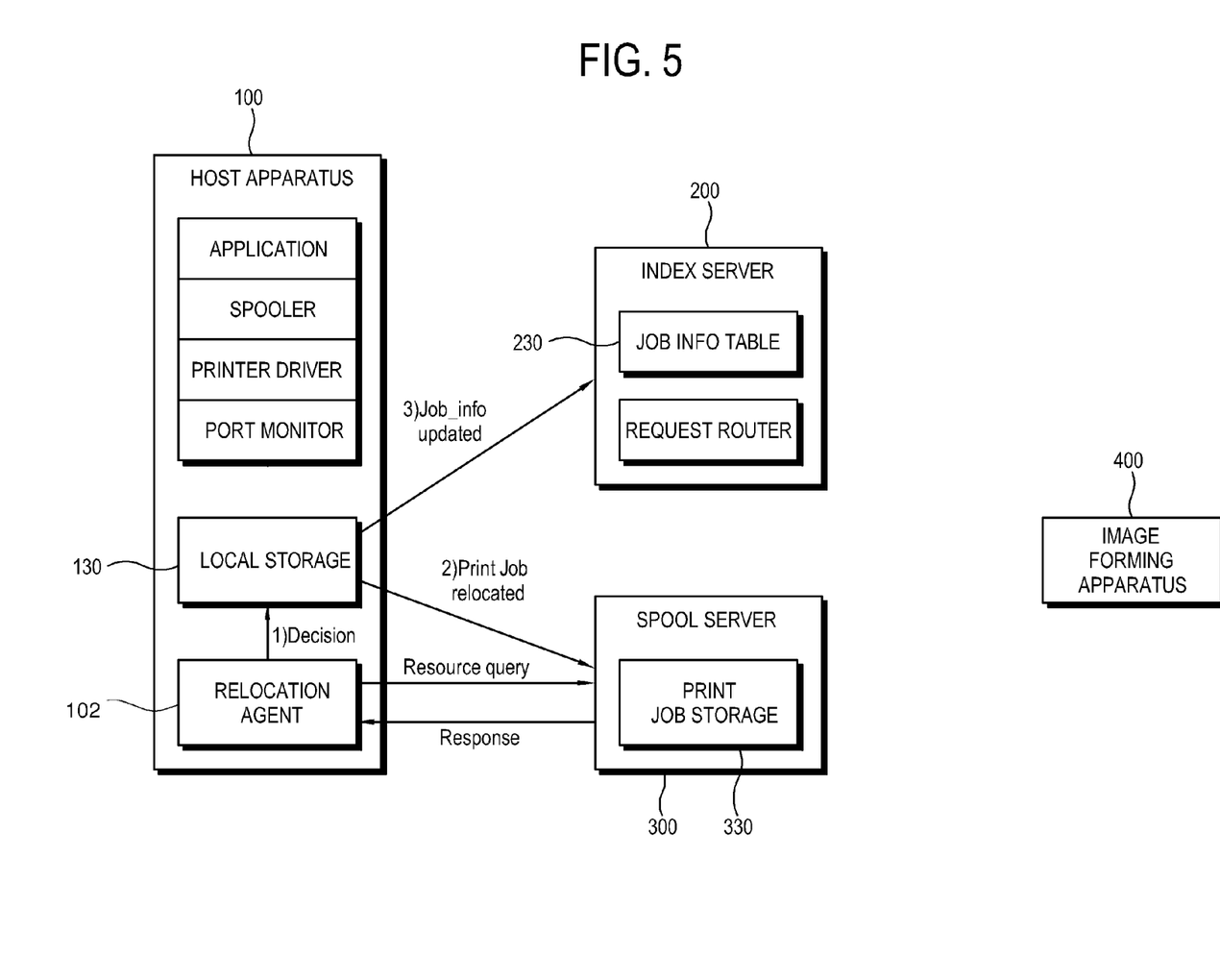
Figure 6:
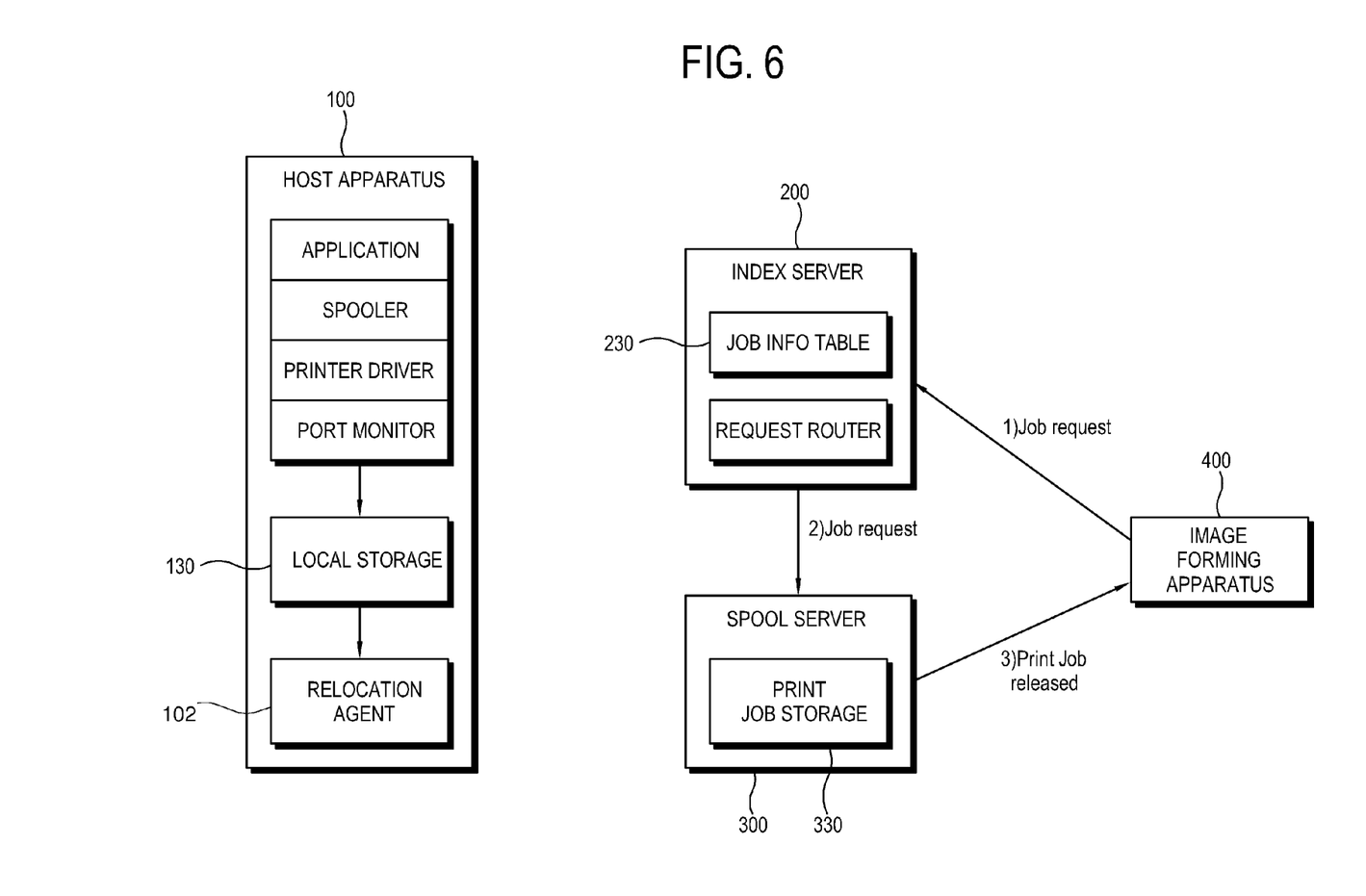

FIGS. 4-6 are diagrams illustrate a pull printing process in the pull printing system 1 according to an exemplary embodiment.

As shown in FIG. 4, the first controller 150 controls the storage of print data so that print data to pull print may be stored (Stored) in the first storage part 130 (LOCAL STORAGE), and job information (Job_info) about the stored print data may be transmitted to the relocation agent and/or the index server 200.

The index server 200 receives the job information about the print data to pull print transmitted from the host apparatus 100, and stores the received job information in the job information table included with the second storage part 230.

While continuously performing communication with the spool server 300, the relocation agent of the host apparatus 100 requires resource information, such as information about the storage space of the spool server 300 (Resource Query), and receives a response thereto (Response), to thereby monitor the spool server 300.

The relocation agent monitors the relocation condition of the print data, as shown in FIG. 3. For example, the relocation agent may monitor the information about the storage space of the spool server 300, and if at least one condition among the relocation conditions shown in FIG. 3 is satisfied, the first controller 150 may control the first communication part 140 to transmit the print data in the first storage part 130 to the spool server 300.

For example, if the storage space of the first storage part 130 of the host apparatus 100 is insufficient, the first controller 150 may immediately transmit the print data to the spool server 300 and notify the index server 200 of the transmission.

Alternatively, as shown in FIG. 4, when the print data to pull print is stored in the host apparatus 100, a print request corresponding to the print data to pull print may be received from the image forming apparatus 400.

In this respect, the print request may include a print option, such as retention and/or deletion. The print option may be preset at the time of generation of the print data in the host apparatus 100, or at the time of the print request from the image forming apparatus 400.

The image forming apparatus 400 transmits, if a print command is received from a user, the print request (Job Request) to the index server 200.

The index server 200 may transmit the print request received from the image forming apparatus 400 to at least one of the host apparatus 100 and the spool server 300 based on the job information about the print data.

For example, in a case where the print data is stored in the host apparatus 100 as shown in FIG. 4, the index server 200 transmits the print request (Job request) to the host apparatus 100.

The first controller 150 controls the first communication part 140 to transmit the print data to pull print, which is stored in the first storage part 130, to the image forming apparatus 400, in response to the received print request (Print Job released).

The first controller 150 controls the first communication part 140 to notify the index server 200 that the print data has been transmitted to the image forming apparatus 400 to print. The index server 200 receives information about printing, and accordingly updates the job information table.

In this respect, the host apparatus 100 selectively deletes the print data in the first storage part 130 based on the print option allocated to the print data transmitted to the image forming apparatus 400 to print.

For example, in a case where the print option is set to the deletion after printing, the first controller 150 may delete the print data after the print data is transmitted to the image forming apparatus 400.

In a case where the print option is set to the retention after printing, the print data is continuously stored in the first storage part 130 after the print data is transmitted to the image forming apparatus 400. In this respect, the first controller 150 may delete the print data if the predetermined retention time of the print data is elapsed.

The first controller 150 notifies the index server 200 of information about the retention or deletion of the print data through the first communication part 140. The index server 200 receives the information about the retention or deletion of the print data and accordingly updates the job information table.

In this respect, the information about the deletion of the print data may be transmitted to the index server 200 before the deletion or after completion of the deletion.

The image forming apparatus 400 prints the print data received from the host apparatus 100.

As shown in FIG. 5, the host apparatus 100 may determine whether the predetermined relocation condition is satisfied with respect to the generated print data, and may transmit the print data to pull print stored in the first storage part 130 to the spool server 300.

Specifically, if there occurs an event satisfying any one of the predetermined conditions in the system event monitor 104, the time monitor 106, the local resource monitor 108 and/or the sever resource monitor 112, the relocation agent 102 decides to transmit the print data to pull print stored in the first storage part 130 to the spool server 300 (Decision).

The first controller 150 transmits the print data from the first storage part 130 to the spool server 300 based on the decision (Print Job Relocated).

The first controller 150 controls the first communication part 140 to transmit information about the relocation of the print data to the index server 200. The index server 200 receives the information about the relocation of the print data, and accordingly updates the job information table.

In this respect, as shown in FIG. 6, in a state when the print data to pull print is transmitted to and stored in the spool server 300, a print request corresponding to the print data to pull print may be received from the image forming apparatus 400.

The print request may include the print option such as retention after printing and/or deletion after printing, and the print option may be set at the time of generation of the print data in the host apparatus 100 and/or may be set at the time of the print request from the image forming apparatus 400.

The image forming apparatus 400 transmits, if a print command is received from a user, the print request (Job request) to the index server 200.

The index server 200 may transmit the print request to the host apparatus 100 and/or the spool server 300 based on job information about the print data received from the image forming apparatus 400.

In this respect, the index server 200 confirms whether the print data is currently stored in the host apparatus 100 and/or in the spool server 300 based on information in the job information table, and transmits the print request to the host apparatus 100 and/or the spool server 400 based on the confirmation result.

For example, as shown in FIG. 5, in a case where the print data is transmitted to the spool server 300 and information about the relocation is transmitted to the index server 200 to update the job information table, the index server 200 confirms the job information table and transmits the print request to the spool server 300.

The third controller 350 of the spool server 300 controls the third communication part 340 to transmit the print data to pull print stored in the third storage part 330 to the image forming apparatus 400 in response to the received print request.

The third controller 350 controls the third communication part 340 to notify the index server 200 that the print data has been transmitted to the image forming apparatus 400 to be printed. The index server 200 receives information about printing and accordingly updates the job information table.

In this respect, the spool server 300 selectively deletes the print data in the third storage part 330 based on the print option allocated to the print data transmitted to the image forming apparatus 40 to be printed.

The third controller 350 notifies the index server 200 of information about retention and/or deletion of the print data through the third communication part 340. The index server 200 receives the information about the retention and/or deletion of the print data and accordingly updates the job information table.

In this respect, the information about the deletion of the print data may be transmitted to the index server 200 before the deletion and/or after completion of the deletion.

The image forming apparatus 400 prints the print data received from the spool server 300.

With this configuration, in the host apparatus 100 according to the present embodiment, the server and/or the host apparatus may be used to store print data to pull print, thereby reducing load concentrating on the server and more efficiently utilizing storage spaces of the host apparatus and the server.

Hereinafter, a printing process in the pull printing system 1 having the pull printing function as configured above will be described with reference to FIGS. 7, 8 and 9.

Figure 7:
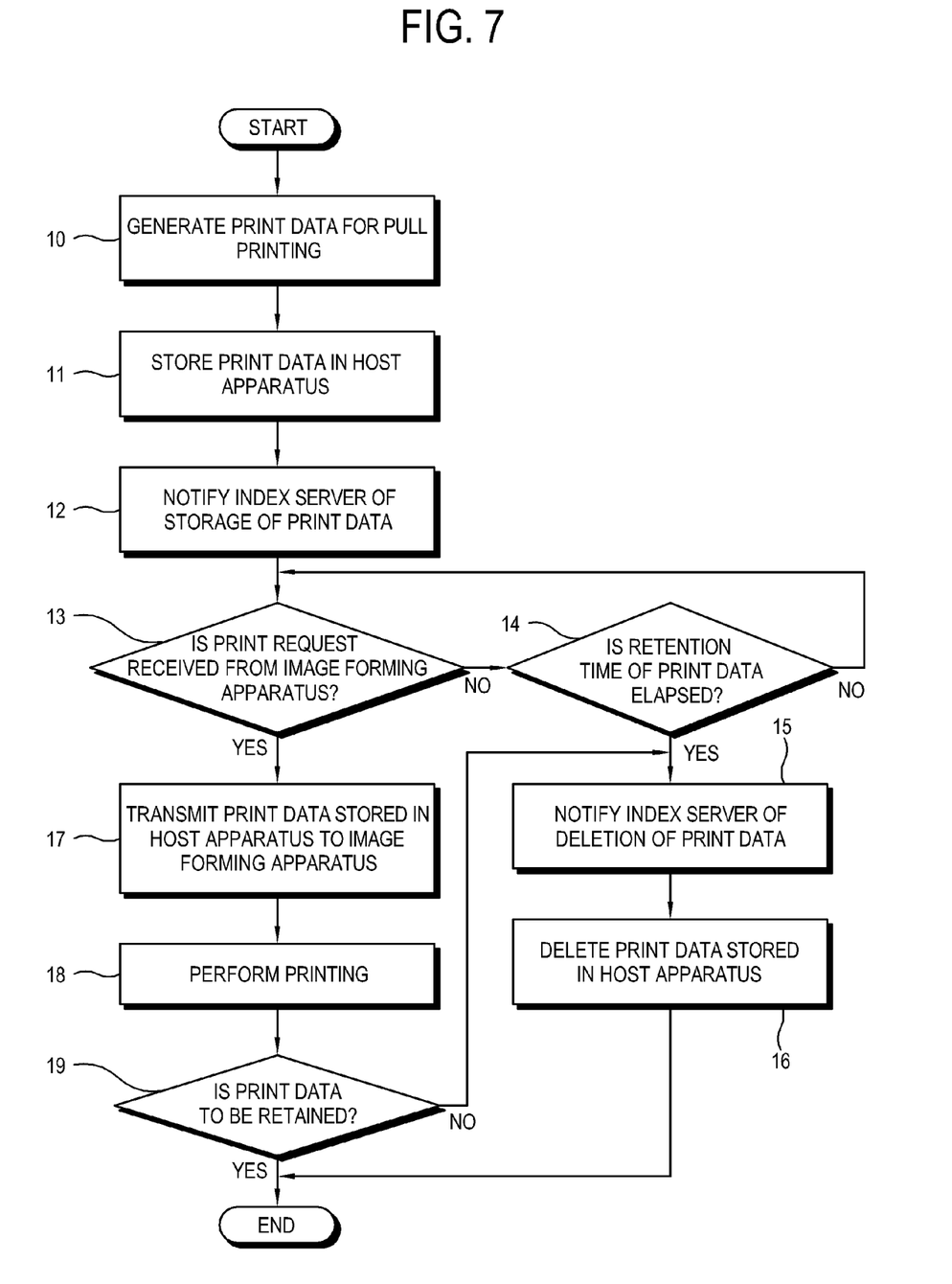
FIG. 7 is a flowchart illustrating a case where a print request is received a state when print data to pull print is stored in a host apparatus.

FIG. 7 is a flowchart illustrating an example of a print request being received in a state where print data to pull print is stored in the host apparatus 100.

As shown in FIG. 7, a user may generate print data to pull print using the host apparatus 100 in operation 10. In this respect, the generated print data may include, but is not limited to, print data identification information indicating the print data to pull print, information about generation time, owner information, etc.

In operation 11, the host apparatus 100 stores the print data generated in operation S10 in the local storage of the host apparatus 100, i.e., the first storage part 130.

The first controller 150 controls the first communication part 140 to notify the index server 200 that the generated print data is stored in the host apparatus 100 in operation 12. The index server 200 stores the received information in the job information table. The stored information includes, but is not limited to, the name, owner, generation time, storage location, etc. of the print data.

In operation 13, the first controller 150 may determine whether a print request corresponding to the print data to pull print generated and stored in operations 10 and 11 is received from the image forming apparatus 400. In this respect, the image forming apparatus 400 receives a print command from a user and then transmits the print request to the index server 200. The index server 200 confirms that the print data is stored in the host apparatus 100 based on the information in the job information table of the second storage part 230, and controls the second communication part 240 to transmit the print request to the host apparatus 100.

In operation 14, in the state when the print request is not received in operation 13, the host apparatus 100 monitors whether a predetermined retention time of the print data to pull print stored in the first storage part 130 elapses. In this respect, the retention time of the print data may be preset as time in which the generated print data is retained until automatic deletion and may be stored in the host apparatus 100. The first controller 150 may compare elapsed time of the print data generated in operation 11 with the predetermined retention time to determine whether the retention time is elapsed.

In operation 15, if it is determined during monitoring that the retention time elapsed, the first controller 150 notifies the index server 200 that the print data is to be deleted. The index server 200 receives the notification and accordingly updates the job information table.

In operation 16, the first controller 150 deletes the print data to pull print stored in the host apparatus 100. In this respect, the deletion in operation 16 may be performed prior to the notification in operation 15, and the deletion may be notified to the index server 200.

Alternatively, if the print request is received in operation 13, the host apparatus 100 transmits the print data stored in the first storage part 130 to the image forming apparatus 400 in operation 17. In this respect, the host apparatus 100 notifies the index server 200 that the print data has been transmitted to the image forming apparatus 400 in response to the print request. The index server 200 receives the notification and accordingly updates the job information table.

The image forming apparatus 400 receives the print data and then performs printing in operation 18.

In operation 19, the host apparatus 100 may determine whether the print data transmitted to the image forming apparatus 400 in operation 17 is to be retained. The determination is performed using information about a print option with respect to the retention of the print data. The print option may include retention after printing and/or deletion after printing. The print option may be set at the time of generation of the print data in operation 10 or at the time of reception of the print request from the image forming apparatus 400. Additionally, the print option may be included in the print data and/or the print request.

If the print option is set to the retention after printing in operation 19, that is, if the print data is to be retained, the host apparatus 100 continuously retains the print data in the first storage part 130.

Alternatively, if the print option is set to the deletion after printing in operation 19, that is, if the print data is to be deleted, the host apparatus 100 notifies the index server 200 that the printing date is to be deleted in operation 15, and deletes the print data stored in the host apparatus 100 in operation 16.

Further, even if the print option is set to the retention after printing in operation S19, the host apparatus 100 may delete the print data in the host apparatus 100 in response to the retention time of the print data elapsing, and may notify the index server 200 of the deletion.

Figure 8:
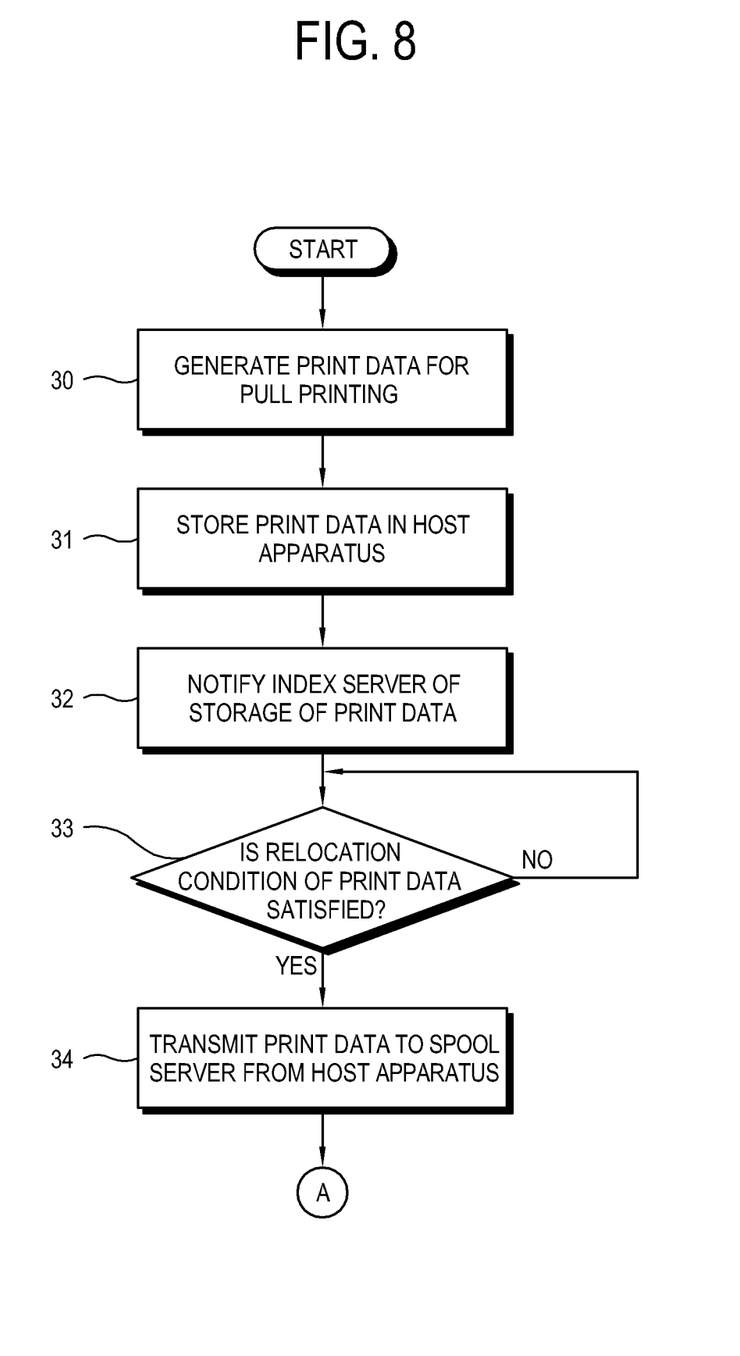
FIGS. 8 and 9 are flowcharts illustrating a case where a print request is received in a state when print data to pull print is transmitted to a spool server from a host apparatus.
Figure 9:
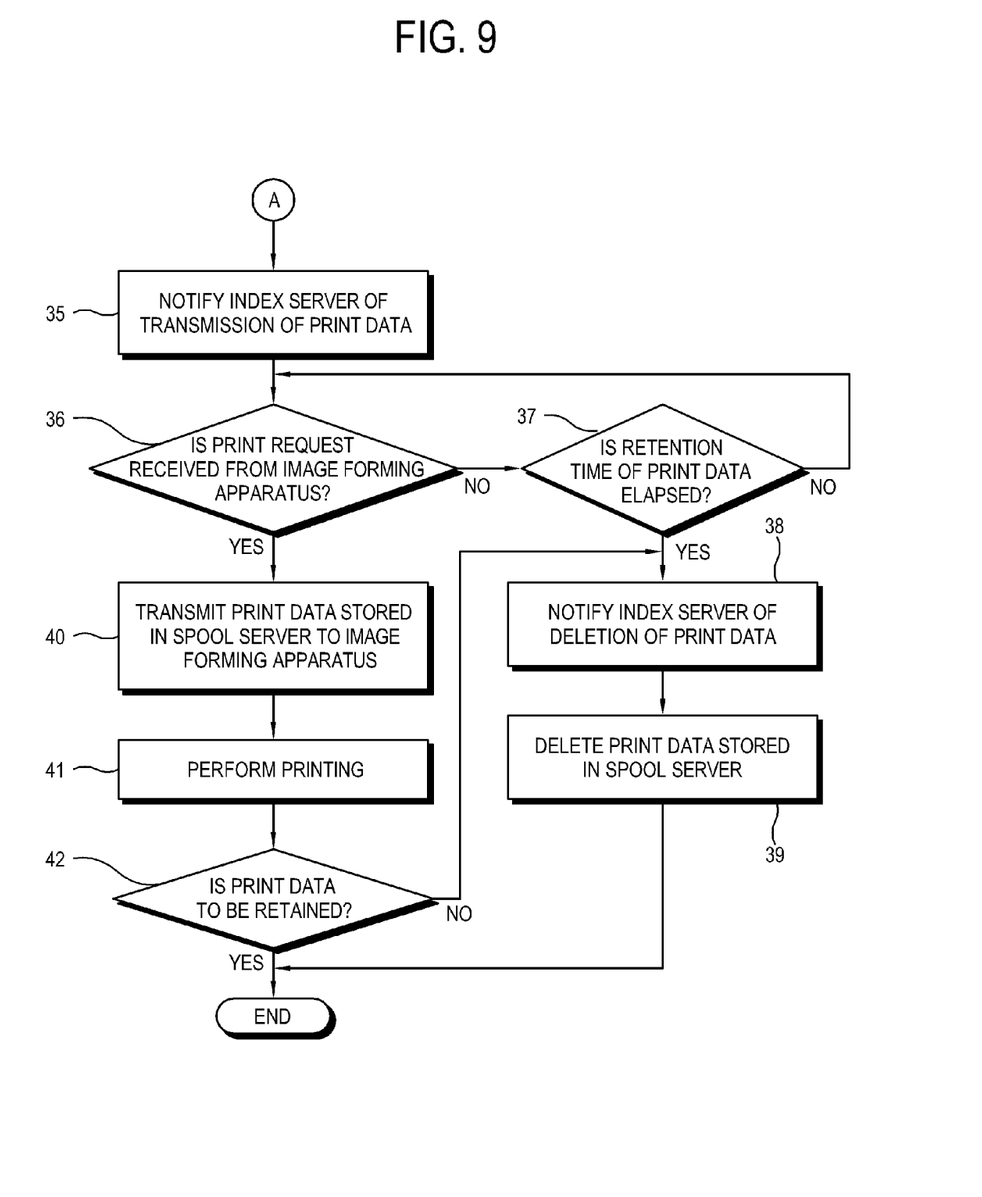

FIGS. 8 and 9 are flowcharts illustrating an example that a print request is received when the print data to pull print is transmitted to the spool server 300 from the host apparatus 100.

As shown in FIG. 8, a user may generate print data to pull print using the host apparatus 100 in operation 30. In this respect, the generated print data may include, but is not limited to, identification information indicating the print data to pull print, information about generation time, owner information, etc. of the print data.

In operation 31, the host apparatus 100 stores the print data generated in operation 30 in the local storage of the host apparatus 100, that is, the first storage part 130.

In operation 32, the first controller 150 controls the first communication part 140 to notify the index server 200 that the generated print data to pull print is stored in the host apparatus 100. The index server 200 stores the received information in the job information table. The stored information includes, but is not limited to, the name, owner, generation time, storage location, etc. of the print data.

In operation 33, the first controller 150 determines whether a predetermined relocation condition is satisfied with respect to the print data generated and stored in operations 30 and 31. In this respect, the relocation condition may include a storage space of the spool server 300, a storage space of the host apparatus 100, a state change of the host apparatus 100, and/or elapsed time of the print data.

In operation 34, as the relocation condition is satisfied in operation 33, the first controller 150 transmits the print data to the spool server 300 from the host apparatus 100.

Referring to FIG. 9, in operation 35, the host apparatus 100 notifies the index server 200 that the print data has been transmitted to the spool server 300 in operation 34. Accordingly, the index server 200 updates the job information table based on the transmission of the print data.

In operation 36, the third controller 350 may determine whether a print request is received from the image forming apparatus 400 corresponding to the print data to pull print generated and relocated in operations 30 and 34. In this respect, the image forming apparatus 400 receives a print request from a user, and transmits the print request to the index server 200. The index server 200 confirms that the print data is stored in the spool server 300 using information in the job information table of the second storage part 230, and controls the second communication part 240 to transmit the print request to the spool server 300.

When the print request is not received in operation 36, the method proceeds to operation 37 and the spool server 300 monitors whether a predetermined retention time of the print data to pull print stored in the third storage part 330 elapses. In this respect, the retention time of the print data may be preset as time in which the generated print data is retained until automatic deletion and may be stored in the spool server 300. The third controller 350 may compare elapsed time of the print data with the retention time to determine whether the retention time has elapsed. The monitoring in operation 37 may be performed in the index server 200 which stores information about the print data in the job information table. In this case, the index server 200 may transmit a command to delete the print data due to the elapse of the retention time, to the spool server 300.

In operation 38, if it is monitored in operation 37 that the retention time of the print data has elapsed, the third controller 350 notifies the index server 200 that the print data is to be deleted. The index server updates the job information table based on the notification.

In operation 39, the third controller 350 deletes the print data to pull print stored in the spool server 300. In one exemplary embodiment, the deletion in operation 39 may be performed prior to operation 38, and the deletion may be notified to the index server 200.

In operation 40, if the print request is received in operation 36, the spool server 300 transmits the print data stored in the third storage part 330 to the image forming apparatus 400. In this respect, the spool server 300 notifies the index server 200 that the print data has been transmitted to the image forming apparatus 400 in response to the print request. The index server 200 updates the job information table based on the notification.

In operation 41, the image forming apparatus 400 performs printing based on the print data transmitted in operation 40.

The spool server 300 may determine whether the print data transmitted to the image forming apparatus 400 is to be retained in operation 42. In this respect, the determination is performed using information about a print option. The print option may include retention after printing and/or deletion after printing. The print option may be set at the time of generation of the print data in operation 30 and/or at the time of reception of the print request from the image forming apparatus 400, and may be included in the print data or the print request In a case where the print option is set to the retention after printing, i.e., if the print data is to be retained, the spool server 300 continuously retains the print data in the third storage part 330. If the retention time of the print data elapses, the spool server 300 deletes the print data in the spool server 300, and may notify the index server 200 of the deletion.

In a case where the print option is set to the deletion after printing, i.e., if the print data is to be deleted, the spool server 300 notifies the index server 200 that the print data is to be deleted in operation 38, and may delete the print data stored in the spool server 300 in operation 39.

In at least one exemplary embodiment, the index server 200 and the spool server 300 may be separately provided as shown in FIGS. 7, 8 and 9, or may be provided as a single server which is capable of storing the job information table and the print data to pull print.

Figure 10:
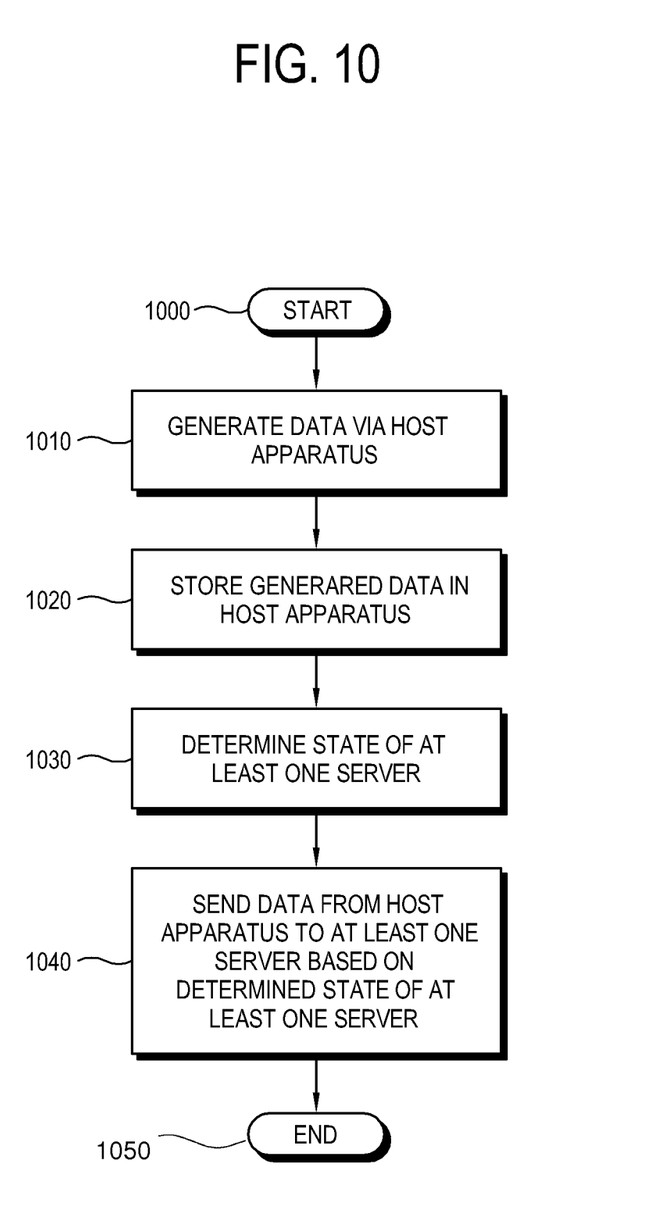
FIG. 10 is a flowchart illustrating a printing method to pull print data according to an exemplary embodiment of the general inventive concept.

Referring now to FIG. 10, a flowchart illustrates a printing method to pull print data according to an exemplary embodiment of the general inventive concept.

The method begins at operation 1000 and proceeds to operation 1010 where a host apparatus 100 generates data to be printed by an image forming apparatus 400. In operation 1020, the data is stored in a first storage part 130 included in the host apparatus 100. In operation 1030, a state of at least one server 200, 300 is determined. The state of the server may include, but is not limited to, determining an amount of available storage space of at least one server 200, 300, and determining whether at least one server received a print request from the host apparatus 100 to print the data. When the state of at least one server 200, 300 is determined, the host apparatus 100 may send data from the first storage part 130 to at least one server 200, 300 in operation 1040, and the method ends in operation 1050.

Although a few embodiments of the present general inventive concept have been shown and described, it would be appreciated by those skilled in the art that changes may be made in these embodiments without departing from the principles and spirit of the general inventive concept, the scope of which is defined in the claims and their equivalents.

What is claimed is:

1. A printing method of a host apparatus using a server that is configured to store print data, comprising:
   generating the print data via the host apparatus;
   storing the generated print data in the host apparatus;
   determining whether a predetermined relocation condition is satisfied with respect to the generated print data based on at least a storage space of the server and a storage space of the host apparatus;
   receiving a print request from an image forming apparatus through the server for the print data stored in the host apparatus;
   transmitting the print data stored in the host apparatus to be received by the image forming apparatus in response to the print request; and
   deleting the print data selectively according to at least one of a plurality of predetermined print options, the plurality of predetermined print options including deletion after printing and retention after printing with respect to the print data,
   the at least one of the plurality of print options being set at time of generation of the print data in the host apparatus or at time of receiving of the print request from the image forming apparatus,
   wherein the print data stored in the host apparatus is transmitted to the server when the predetermined relocation condition with respect to the print data is satisfied.

2. The method according to claim 1, wherein the predetermined relocation condition further comprises a state change of the host apparatus, such that the state change comprises at least one of shutdown, reboot, user logout, and no response of the host apparatus, and elapsed time of the print data.

3. The method according to claim 2, wherein the state change further comprises transition to a power save mode.

4. The method according to claim 1, further comprising:
   displaying a pop-up message in the host apparatus so that a user can select relocation of the print data in response to satisfying the predetermined relocation condition with respect to the print data.

5. The method according to claim 1, wherein the storing of the generated print data comprises notifying the server of job information about the print data.

6. The method according to claim 1, further comprising:
   determining whether a predetermined retention time of the print data elapses; and
   deleting the print data stored in at least one of the host apparatus and the server in response to the predetermined retention time elapsing.

7. The method according to claim 1, further comprising adjusting transmission time of the print data so that the print data is transmitted to the server when the storage space of the host apparatus is insufficient.

8. The method according to claim 1, further comprising adjusting transmission time of the print data to be delayed when the storage space of the server is low.

9. A host apparatus that is connectable to a server that is configured to store print data, comprising:
   an image processing part that generates the print data;
   a storage part that stores the generated print data;
   a communication part that performs communication with the server; and
   a controller that determines whether a predetermined relocation condition is satisfied with respect to the generated print data based on at least a storage space of the server and a storage space of the host apparatus, and controls the communication part to transmit the print data stored in the storage part to the server in response to satisfying the predetermined relocation condition with respect to the print data,
   wherein the controller receives a print request from an image forming apparatus through the server for the print data stored in the storage part, transmits the print data stored in the storage part to be received by the image forming apparatus in response to the print request, and deletes the print data stored in the storage part based on at least one of a plurality of predetermined print options including deletion after printing and retention after printing with respect to the print data,
   the at least one of the plurality of print options being set at time of generation of the print data in the host apparatus or at time of receiving of the print request from the image forming apparatus.

10. The host apparatus according to claim 9, wherein the predetermined relocation condition further comprises a state change of the host apparatus, such that the state change comprises at least one of shutdown, reboot, user logout, and no response of the host apparatus and elapsed time of the print data.

11. The host apparatus according to claim 10, wherein the state change further comprises transition to a power save mode.

12. The host apparatus according to claim 9, further comprising:
   a display part to display a pop-up message so that a user can select relocation of the print data in response to satisfying the predetermined relocation condition with respect to the print data.

13. The host apparatus according to claim 9, wherein the communication part notifies the server of job information about the print data.

14. The host apparatus according to claim 9, wherein the controller determines whether a predetermined retention time of the print data elapses, and deletes the print data stored in the storage part in response to the predetermined retention time elapsing.

15. The host apparatus according to claim 9, wherein the controller adjusts transmission time of the print data so that the print data is transmitted to the server when the storage space of the host apparatus is insufficient.

16. The host apparatus according to claim 9, wherein the controller adjusts transmission time of the print data to be delayed when the storage space of the server is low.

* * * * *